(12) United States Patent
Dang et al.

(10) Patent No.: US 10,257,196 B2
(45) Date of Patent: *Apr. 9, 2019

(54) ACCESS CONTROL FOR A DOCUMENT MANAGEMENT AND COLLABORATION SYSTEM

(71) Applicant: Amazon Technologies, Inc., Seattle, WA (US)

(72) Inventors: Wei Lien Stephen Dang, Mountain View, CA (US); Cynthia Zhang Taylor, San Leandro, CA (US); Arun Ponniah Sethuramalingam, San Jose, CA (US); Catherine Emily Harrell, San Francisco, CA (US); Sharad Kala, Sunnyvale, CA (US); Liangliang Wang, Foster City, CA (US); Kevin Gillett, Menlo Park, CA (US); Nandhini Nandiwada Santhanam, San Jose, CA (US); Nagesh Pradhan Cadabam, Sunnyvale, CA (US); Noah Anthony Eisner, Menlo Park, CA (US); Stephen Joseph Oakley, Mountain View, CA (US); Himanshu Khurana, Mountain View, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/197,632

(22) Filed: Jun. 29, 2016

(65) Prior Publication Data

US 2016/0315941 A1    Oct. 27, 2016

Related U.S. Application Data

(63) Continuation of application No. 14/175,884, filed on Feb. 7, 2014, now Pat. No. 9,449,182.

(51) Int. Cl.
*G06F 21/62* (2013.01)
*H04L 29/06* (2006.01)
(Continued)

(52) U.S. Cl.
CPC ........ *H04L 63/10* (2013.01); *G06F 17/30011* (2013.01); *G06F 17/3023* (2013.01);
(Continued)

(58) Field of Classification Search
CPC ..... H04L 63/101; G06F 21/62; G06F 21/6209
See application file for complete search history.

(56) References Cited

U.S. PATENT DOCUMENTS

| 5,251,315 A | 10/1993 | Wang |
| 5,577,188 A | 11/1996 | Zhu |

(Continued)

FOREIGN PATENT DOCUMENTS

| JP | H10240220 A | 9/1998 |
| JP | 2007501969 A | 2/2007 |

(Continued)

OTHER PUBLICATIONS

International Search Report and Written Opinion dated Mar. 31, 2015, in International Patent Application No. PCT/US2014/64875, filed Nov. 10, 2014.

(Continued)

*Primary Examiner* — David J Pearson
(74) *Attorney, Agent, or Firm* — Davis Wright Tremaine LLP

(57) ABSTRACT

A method and apparatus for controlling access to documents retained by a document management and collaboration system is disclosed. The document management and collaboration system may generate one or more suggested privileges associated with one or more users. An access control policy may specify whether system-generated user (Continued)

privileges may be enforced. If they are enforced, access to one or more document may be made subject to the generated privileges.

20 Claims, 10 Drawing Sheets

(51) Int. Cl.
*G06F 17/30* (2006.01)
*H04L 12/58* (2006.01)
*H04L 29/08* (2006.01)

(52) U.S. Cl.
CPC .. *G06F 17/30091* (2013.01); *G06F 17/30115* (2013.01); *G06F 17/30174* (2013.01); *G06F 17/30194* (2013.01); *G06F 17/30203* (2013.01); *G06F 17/30235* (2013.01); *G06F 17/30867* (2013.01); *G06F 21/62* (2013.01); *H04L 51/04* (2013.01); *H04L 63/101* (2013.01); *H04L 63/20* (2013.01); *H04L 51/22* (2013.01); *H04L 67/02* (2013.01); *H04L 67/306* (2013.01)

(56) References Cited

U.S. PATENT DOCUMENTS

| | | | |
|---|---|---|---|
| 5,596,754 | A | 1/1997 | Lomet |
| 5,832,470 | A | 11/1998 | Morita et al. |
| 5,878,398 | A | 3/1999 | Tokuda et al. |
| 5,991,713 | A | 11/1999 | Unger et al. |
| 6,314,425 | B1 | 11/2001 | Serbinis et al. |
| 6,397,205 | B1 | 5/2002 | Juola |
| 6,442,555 | B1 | 8/2002 | Shmueli et al. |
| 6,505,195 | B1 | 1/2003 | Ikeda et al. |
| 6,553,365 | B1 | 4/2003 | Summerlin et al. |
| 6,687,876 | B1 | 2/2004 | Schilit et al. |
| 6,687,878 | B1 | 2/2004 | Eintracht et al. |
| 6,725,239 | B2 | 4/2004 | Sherman et al. |
| 6,763,346 | B1 | 7/2004 | Nishida et al. |
| 7,177,886 | B2 | 2/2007 | Pruet |
| 7,882,110 | B2 | 2/2011 | Bahr |
| 8,429,753 | B2 | 4/2013 | Skaria et al. |
| 8,527,461 | B2 | 9/2013 | Ducott et al. |
| 8,655,950 | B2 | 2/2014 | Scherpa et al. |
| 8,825,502 | B2 | 9/2014 | Bormann et al. |
| 8,843,494 | B1 | 9/2014 | Sampson |
| 8,938,669 | B1 | 1/2015 | Cohen |
| 9,020,893 | B2 | 4/2015 | Zalpuri et al. |
| 9,047,368 | B1 | 6/2015 | Cooley |
| 9,106,687 | B1* | 8/2015 | Sawhney ............ H04L 63/1416 |
| 2001/0042085 | A1 | 11/2001 | Peairs et al. |
| 2002/0138529 | A1 | 9/2002 | Yang-Stephens et al. |
| 2003/0061221 | A1 | 3/2003 | Ito et al. |
| 2004/0068697 | A1 | 4/2004 | Harik et al. |
| 2004/0205542 | A1 | 10/2004 | Bargeron et al. |
| 2004/0210833 | A1 | 10/2004 | Lerner et al. |
| 2004/0230577 | A1 | 11/2004 | Kawatani |
| 2004/0267746 | A1* | 12/2004 | Marcjan ............ G06F 21/6218 |
| 2005/0010799 | A1 | 1/2005 | Kelley et al. |
| 2005/0022106 | A1 | 1/2005 | Kawai et al. |
| 2005/0034062 | A1 | 2/2005 | Bufkin et al. |
| 2005/0038787 | A1 | 2/2005 | Cheung et al. |
| 2005/0044494 | A1 | 2/2005 | Barnes et al. |
| 2005/0055306 | A1 | 3/2005 | Miller et al. |
| 2005/0160356 | A1 | 7/2005 | Albornoz et al. |
| 2005/0240580 | A1 | 10/2005 | Zamir et al. |
| 2005/0251675 | A1* | 11/2005 | Marcjan ............ G06F 21/6218 713/100 |
| 2006/0053365 | A1 | 3/2006 | Hollander et al. |
| 2006/0125846 | A1 | 6/2006 | Springer et al. |
| 2006/0150079 | A1 | 7/2006 | Albornoz et al. |
| 2006/0183462 | A1 | 8/2006 | Kolehmainen |
| 2006/0248083 | A1 | 11/2006 | Sack et al. |
| 2007/0118795 | A1 | 5/2007 | Noyes et al. |
| 2007/0156732 | A1* | 7/2007 | Surendran ............ G06Q 10/107 |
| 2007/0208994 | A1 | 9/2007 | Reddel et al. |
| 2007/0271249 | A1 | 11/2007 | Cragun et al. |
| 2008/0040342 | A1 | 2/2008 | Hust et al. |
| 2008/0052291 | A1 | 2/2008 | Bender |
| 2008/0222512 | A1 | 9/2008 | Albornoz et al. |
| 2009/0217158 | A1 | 8/2009 | Bailey |
| 2009/0260060 | A1 | 10/2009 | Smith et al. |
| 2009/0265747 | A1 | 10/2009 | Li |
| 2010/0010998 | A1 | 1/2010 | Wagner |
| 2010/0030578 | A1 | 2/2010 | Siddique et al. |
| 2010/0095203 | A1 | 4/2010 | Toebes et al. |
| 2010/0174983 | A1 | 7/2010 | Levy et al. |
| 2010/0211781 | A1 | 8/2010 | Auradkar et al. |
| 2010/0241668 | A1 | 9/2010 | Susanto et al. |
| 2010/0318893 | A1 | 12/2010 | Matthews et al. |
| 2010/0325686 | A1* | 12/2010 | Davis ..................... G06F 21/62 726/1 |
| 2011/0055180 | A1 | 3/2011 | Lumley et al. |
| 2011/0078615 | A1 | 3/2011 | Bier |
| 2011/0088091 | A1 | 4/2011 | Petronijevic et al. |
| 2011/0099152 | A1 | 4/2011 | Law et al. |
| 2011/0145593 | A1 | 6/2011 | Auradkar et al. |
| 2011/0178981 | A1 | 7/2011 | Bowen et al. |
| 2011/0197266 | A1 | 8/2011 | Chu et al. |
| 2011/0231222 | A1 | 9/2011 | Sharma et al. |
| 2011/0289105 | A1 | 11/2011 | Hershowitz |
| 2011/0296517 | A1 | 12/2011 | Grigoriev et al. |
| 2011/0302213 | A1 | 12/2011 | Comanescu |
| 2012/0030553 | A1 | 2/2012 | Delpha et al. |
| 2012/0136936 | A1* | 5/2012 | Quintuna .............. G06F 21/604 709/204 |
| 2012/0192086 | A1 | 7/2012 | Ghods et al. |
| 2012/0222132 | A1 | 8/2012 | Burger et al. |
| 2012/0284605 | A1 | 11/2012 | Sitrick et al. |
| 2012/0323968 | A1 | 12/2012 | Yih et al. |
| 2013/0013560 | A1 | 1/2013 | Goldberg et al. |
| 2013/0104028 | A1 | 4/2013 | Murray et al. |
| 2013/0151970 | A1 | 6/2013 | Achour |
| 2013/0191451 | A1 | 7/2013 | Tse et al. |
| 2013/0219176 | A1 | 8/2013 | Akella et al. |
| 2013/0311420 | A1 | 11/2013 | Tehranchi et al. |
| 2014/0026025 | A1 | 1/2014 | Smith |
| 2014/0089775 | A1 | 3/2014 | Worsley et al. |
| 2014/0115436 | A1 | 4/2014 | Beaver et al. |
| 2014/0115450 | A1 | 4/2014 | Zhong et al. |
| 2014/0196115 | A1 | 7/2014 | Pelykh |
| 2014/0229556 | A1* | 8/2014 | Cooper .................. H04L 51/28 709/206 |
| 2014/0250073 | A1 | 9/2014 | Zalpuri et al. |
| 2014/0281875 | A1 | 9/2014 | Branton et al. |
| 2014/0282921 | A1 | 9/2014 | Filman et al. |
| 2014/0351907 | A1 | 11/2014 | Noble |
| 2015/0067150 | A1 | 3/2015 | Heredia et al. |
| 2015/0106378 | A1 | 4/2015 | Clark et al. |
| 2015/0134600 | A1 | 5/2015 | Eisner et al. |
| 2015/0169500 | A1 | 6/2015 | Balinsky et al. |

FOREIGN PATENT DOCUMENTS

| | | |
|---|---|---|
| JP | 2009086742 A | 4/2009 |
| JP | 2011191862 | 9/2011 |
| KR | 20100080802 A | 7/2010 |
| KR | 20110000655 A | 1/2011 |
| KR | 101159504 B1 | 6/2012 |
| KR | 20140092831 A | 7/2014 |
| WO | 2009105735 A2 | 8/2009 |

OTHER PUBLICATIONS

Eppstein et al., "What's the Difference? Efficient Set Reconciliation Without Prior Context?", SIGCOMM '11, Toronto Ontario, Canada, Aug. 15-19, 2011, 12 pages.
International Search Report and Written Opinion dated Aug. 28, 2015, International Patent Application No. PCT/US2015/014911, filed Feb. 6, 2015.

(56) References Cited

OTHER PUBLICATIONS

Kong et al., "Graphical Overlays: Using Layered Elements to Aid Chart Reading," IEEE Transactions on Visualizationa and Computer Graphics 18(21): 2631-2638, published online Oct. 9, 2012, print publication Dec. 1, 2012.

"Decision of Patent Grant dated Oct. 2, 2017," Korean Patent Application No. 10-2016-7015415, filed Nov. 10, 2014, four pages.

"Extended European Search Report, dated Oct. 27, 2017," European Patent Application No. 14859862.6, filed Nov. 10, 2014, 12 pages.

Australian Notice of Acceptance for Patent Application dated Nov. 17, 2017, Patent Application No. 2014346473, filed Nov. 10, 2014, 3 pages.

Japanese Final Rejection dated Mar. 26, 2018, Patent Application No. 2016-528236, filed Nov. 10, 2014, 4 pages.

Canadian Office Action dated Jun. 28, 2018, Patent Application No. 2930415, filed Nov. 10, 2014, 4 pages.

Doi et al., "A proposal of an Annotation System CollabSticky Focused on Collecting Comments in Presentation," Information Processing Society of Japan 2007(1):159-164, Jul. 2007.

He et al, "RIDEE-SPS: Presentation System for Realtime Interactive Distance Education Environment," Information Processing Society of Japan 44(3):700-708, Mar. 15, 2003.

Japanese First Office Action dated Oct. 15, 2018, Patent Application No. 2018-138930, filed Nov. 10, 2014, 4 pages.

Chinese First Office Action dated Dec. 3, 2018, Patent Application No. 201480072858.7, filed Nov. 10, 2014, 8 pages.

Singaporean Notice of Eligibility for Grant and Supplementary Examination Report dated Dec. 24, 2018, Patent Application No. 11201603644X, filed Nov. 10, 2014, 3 pages.

\* cited by examiner

ACCESS CONTROL FOR A DOCUMENT MANAGEMENT AND COLLABORATION SYSTEM

CROSS-REFERENCE TO RELATED APPLICATIONS

This application is a continuation of U.S. patent application Ser. No. 14/175,884, filed Feb. 7, 2014, entitled "ACCESS CONTROL FOR A DOCUMENT MANAGEMENT AND COLLABORATION SYSTEM," which incorporates by reference for all purposes the full disclosures of U.S. patent application Ser. No. 14/077,204, filed Nov. 11, 2013, entitled "DOCUMENT MANAGEMENT AND COLLABORATION SYSTEM" and U.S. patent application Ser. No. 14/175,898, filed Feb. 7, 2014, entitled "FORMING A DOCUMENT COLLECTION IN A DOCUMENT MANAGEMENT AND COLLABORATION SYSTEM."

BACKGROUND

The use of remote computing services, such as remote document storage, has greatly increased in recent years. An organization, for example, may support its operations using both internal networks of computing resources and computing resources managed by others. Computers of the organization, for instance, may communicate with computers of other organizations to access and/or provide documents or other data while using services of another organization. In many instances, organizations configure and operate remote networks using hardware managed by other organizations, thereby reducing infrastructure costs and achieving other advantages. With such configurations of computing resources, ensuring that access to the resources and the data they hold can be challenging, especially given the multitude of different computing systems. For example, computers of the organization may include Personal Computers, Tablets, Smartphones, Laptops and other devices.

It is often challenging to implement mechanisms that ensure that documents are properly shared among users by providing users with an appropriate level of access to documents. Further, it is often challenging to ensure that existing access privileges are examined in order to improve security when documents are shared.

BRIEF DESCRIPTION OF THE DRAWINGS

Various embodiments in accordance with the present disclosure will be described with reference to the drawings, in which.

DETAILED DESCRIPTION

Figure 1:
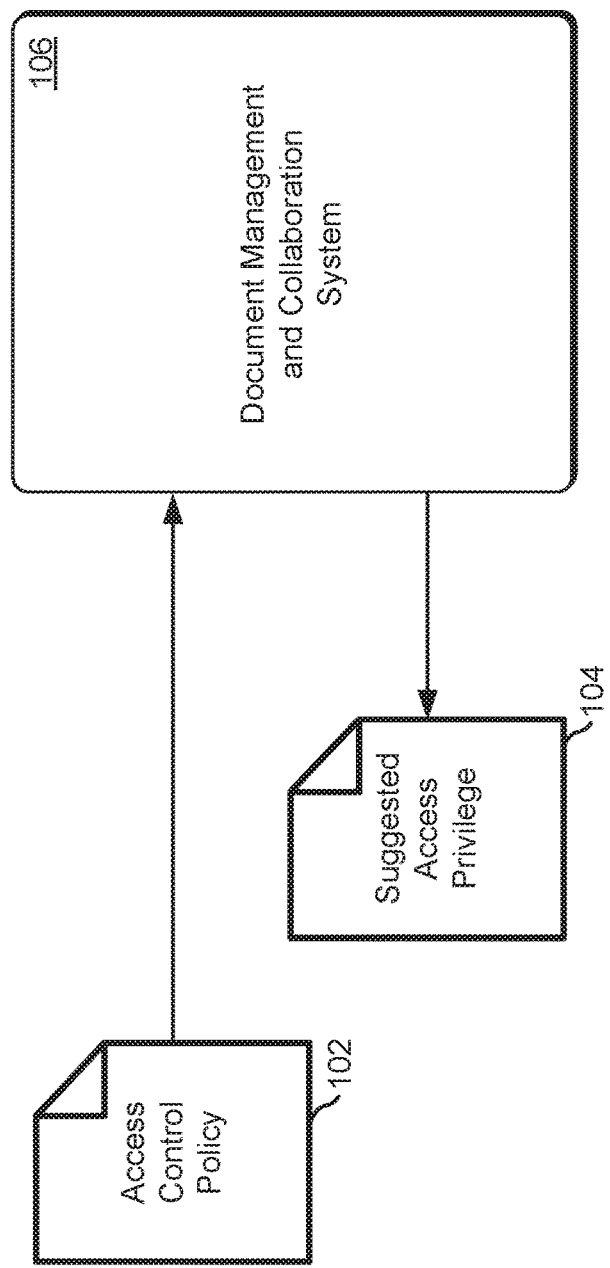
FIG. 1 shows an example of a document management and collaboration system configured to suggest access privileges in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include controlling access to one or more documents retained by a document management and collaboration system. The document management and collaboration system may store documents for an organization comprising a number of members (for example, administrators and users) and may facilitate sharing the documents between the members. Accordingly, more than one user can access a document. Further, the users may annotate the document, provide feedback on the document or otherwise comment on the document.

An administrator for an organization may be responsible for setting access privileges that are given to various users within the organization. The administrator may specify an access control policy that dictates the access privileges given to users. Per the access privileges, the user may be permitted or denied from viewing a document, commenting on the document or expanding a sharing permission of the document to a member or a non-member of the organization or a registered or non-registered users of the document management and collaboration system, among others.

The document management and collaboration system or another entity may formulate access privileges for one or more users, and the formulated access privileges may be suggested to the administrator for enforcement or for incorporation in an access control policy. The suggested access privileges may be based at least in part on attributes of users or documents. The attributes may be used to determine a user affinity for a document or may be used to measure a significance of the document to a user. The attributes of users or documents may be received from one or more services utilized by the users, such as an email service, a calendar service or a location service, among others. For example, an email service may indicate that a user that uploaded a document also sent the document to one or more other users. Accordingly, the document may be deemed as significant to the one or more other users and a measure for affinity or significance of the document to the user may be updated.

Further, one or more engines may be used for obtaining a user or document attribute, such as a cluster matching engine that correlates a character map (also referred to herein as a word cloud or a word map) of characters that appear in the content of a document with a character map of a user. The character map of the user may be constructed based at least in part on the content of documents accessed by a user or uploaded by the user. Attributes received by the document management and collaboration system or a measure of affinity obtained based at least in part on the attributes may be used to suggest an access privilege for the user.

The suggested access privileges may be made available to an administrator (for example, by sending a notification to the administrator or by storing the suggested access in a database or data store accessible to the administrator), and, in turn, the administrator may provide an indication as to whether the suggested access privileges are to be enforced for document access. In alternative embodiments, an access control policy may indicate that some (for example, access privileges below a certain level) or all suggested access privileges may be enforced without prior acceptance by an administrator.

As described herein, an access control policy may specify that a user, without prior authorization from an administrator, may expand a permission associated with a document, for example, by sharing the document with a set of users and causing the set of users to have a permission to access the document. As described herein, a permission to access a document may be a privilege to view the document, modify the document, provide feedback on the document and/or annotate the document, among others. Modifying the document may include changing the content of the document or adding a new version of the document. After the permission is granted, the user may be prompted to confirm that the permission is to remain in force. Prompting the user may be performed based at least in part on a trigger, periodically or according to a time schedule. If the user does not confirm that the permissions are to remain in force, the permissions may be denied or some or all of the set of users may granted a permission level set by the access control policy, whereby the permission level set by the policy may be lower than that presently provided to the set of users. Further, the policy may specify that the permission is to be set by the document management and collaboration system based at least in part on a measure of affinity or significance. As described herein, setting or resetting a permission of a set of users or soliciting a user to confirm an expanded permission is referred to herein as baselining.

FIG. 1 shows an example of a document management and collaboration system configured to suggest access privileges in accordance with at least one embodiment. The document management and collaboration system 106 may manage a collection of documents for an organization and may facilitate access to the documents. Further, the document management and collaboration system 106 may enforce access policies for the documents. As shown in FIG. 1, the document management and collaboration system 106 receives an access control policy (for example, from an administrator of the organization) and uses the access control policy to govern access to the documents. For example, based at least in part on the access control policy the document management and collaboration system 106 may permit or deny user access to the document or restrict one or more actions taken by the user with respect to a document of the organization.

In addition, the document management and collaboration system 106 may formulate suggested access privileges for users. For example, the document management and collaboration system 106 may utilize document or user attributes to recommend a privilege to be given to a user. The one or more attributes may be received from a variety of services, such as an email service, a calendar service or a corporate directory. For example, the email service may indicate that a user that uploaded a document has referenced the document in an email to one or more users. Accordingly, the indication may be used to determine whether the one or more users are candidates for receiving access to the document. In another example, a calendar service may indicate that the one or more users are scheduled to meet with the user that uploaded the document for a specified period of time. Accordingly, the indication may be used to determine whether the one or more users are to be given access to the document for the specified period of time. The document management and collaboration system 106 may formulate a suggested access privilege 104 for the one or more users and provide the suggested access privilege to an administrator or the user (for example, the user that uploaded the document). Further, a determination as to whether to enforce the suggested access privilege 104 may be made by the administrator or the user. In some embodiment, the access control policy may specify whether the suggested access privilege 104 may be enforced.

Figure 2:
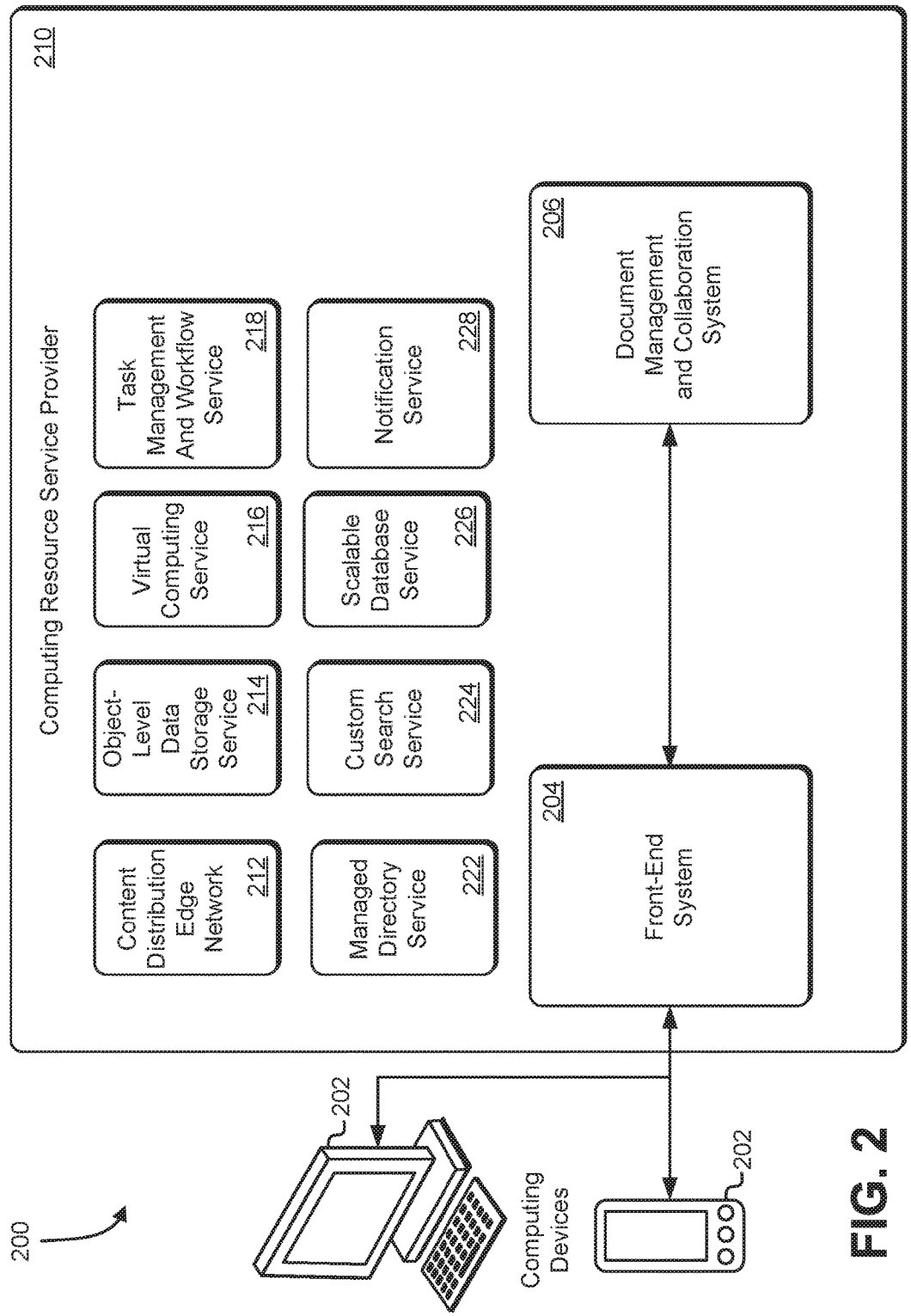
FIG. 2 shows an example of computing devices connected to a computing resource service provider in accordance with at least one embodiment.

FIG. 2 shows an example of computing devices connected to a computing resource service provider in accordance with at least one embodiment. The computing devices 202 may be any device that is capable of communicating with the computing resource service provider 210 or its entities. The computing devices 202 may also be equipped with local or remote (for example, network-based) computational and storage capabilities. The computational capabilities may be provided or enabled by a processor, such as a central processing unit (CPU), graphics processing unit (GPU), digital signal processor and the like. Examples of CPUs include CPUs that employ an x86 architecture (for example, as used in desktop and laptop computing devices) or a reduced instruction set computing (RISC) architecture (for example, as used in smartphone and tablet computing devices). The computing devices 202 may also be equipped with communications and networking hardware and may be capable of communicating using any communications protocol. Further, the computing devices 202 may be equipped with input/output devices that may include a display, a touch screen-based or keyboard-based input device or speakers. Additionally, the computing devices may include any type of memory, such as static or dynamic memory, and a power source or a power adapter. Aside from their hardware capability, the computing devices 202 may be configured to run or execute an operating system and/or other programs and the computing devices' 202 associated memory may store executable instructions that, when executed by one or more processor, cause one or more functions to be performed or cause the operating system and/or other programs to run. Although two devices are shown in FIG. 2, any number of devices may be contemplated in various embodiments. Further, the computing devices 202 may communicate with the computing resource service provider 210 or any entity of the computing resource service provider 210 via a network (not shown). The network may be public or private, whereby examples of the network include the Internet and an Internet service provider (ISP) network.

The computing devices 202 may collectively or individually be associated with a user or a customer of the computing resource service provider 210 or its entities and functions. The user may be part of an organization that may utilize one or more of the services provided by the computing resource service provider 210 to maintain and deliver information to its employees, which may be located in various geographical locations. Additionally, the user may be an individual that utilizes the services of the computing resource service provider 210 to deliver content to a working group located remotely. Further, one or more of the computing device 202 may belong to an administrator of an organization or a group. The administrator may utilize the computing device 202 to communicate with the computing resource service provider 210 to specify access control policies. Utilizing a computing device, the administrator may specify permission levels of users.

The computing resource service provider 210 includes a front-end system 204 and a file management and collaboration system 206 as well as plurality of services and systems as shown in FIG. 2. These include a content distribution edge network 212, an object-level data storage service 214, a virtual computing service 216, a task management and workflow service 218, a managed directory service 222, a custom search service 224, a scalable database service 226 and a notification service 228. It is noted that in various embodiments, the computing resource service provider 210 may include fewer services and systems than those described with references to FIG. 2 or may include additional or alternative services or systems to those described with reference to FIG. 2. Further, in alternative embodiments, the systems and services may be utilized outside the context of the computing resources service provider 210. For example, the services and systems may be stand-alone or used in conjunction with systems and services other than those described with reference to FIG. 2.

The front-end system 204 may be a gateway to the file management and collaboration system 206 and may offer private and public services to users, administrators or their computing devices 202. Access to the front end system 204 may require authorization or user authentication. In addition, a device or user privilege level may govern access to the front-end system 204 and any data exchanges between the front-end system 204 and the computing devices 202. Access to the front-end system 204 may be governed by a privilege level associated with a computing device 202 or a privilege level or credential given to the computing device 202 or a user of the computing device 202, for example, by a group or organization administrator.

The front-end system 204 may perform authentication of a customer, a user or a device before granting access to the resources of the file management and collaboration system 206. The authentication may be based on credentials, such as username and password information, or access tokens, among others. The front-end system 204 may provide services and interfaces that permit or enable user access. For example, the front-end system 204 may enable a web-based platform or a console-based platform that provides information related to the services of the computing resource service provider 210 to the user. Further, the front-end system 204 may enable the user to execute applications or tasks in the computing resource service provider 210, track and manage the execution of the applications or tasks and receive the results of the execution and transmit the results to user devices. As further described herein, the front-end system 204 may be the gateway by which the user or associated devices 202 may utilize the plurality of services provided by the computing resource service provider 210.

The document management and collaboration system 206 may be a collection of computing devices and other resources collectively configured to enable and manage the execution and processing of documents for collaboration between one or more users in a distributed system. The document management and collaboration system 206 may, for example, enable uploading documents to the computing resource service provider 210 and retaining and modifying metadata associated with the documents. The document management and collaboration system 206 may further allow for search functions associated with the documents or their metadata as well as collaborations between users on the documents.

Although the term "document" is used herein to describe objects produced or collaborated on by users of the computing resource service provider 206, the term "document" is not limited to media, such as audio-visual media. A document may be computer files that are capable of being produced by or edited or viewed using a productivity program or suite. Accordingly, the document may be editable or non-editable text, images, drawings and websites, among others.

The content distribution edge network 212 of the computing resource service provider 210 may be a collection of computing devices and other resources collectively configured to deliver content, such as web content, to a plurality of users. The content distribution edge network 212 may have a plurality of edge locations, for example, that are distributed in world-wide locations that are strategically placed to optimize user data throughput and minimize latency. The content distribution edge network 212 may receive requests for content and deliver the requested content to users. The content distribution edge network 212 may interface with a storage service that stores a portion or all of the content and may cause the content to be retrieved and provided to a requesting party. The content distribution edge network 212 may be utilized to enable user-accessible websites or web applications of the front-end system 204.

The object-level data storage service 214 may be a collection of computing resources configured to synchronously process requests to store and/or access data. The object-level data storage service 214 may operate using computing resources (e.g., databases) that enable the object-level data storage service 214 to locate and retrieve data quickly, so as to allow data to be provided in responses to requests for the data. For example, the object-level data storage service 214 may maintain stored data in a manner such that, when a request for a data object is retrieved, the data object can be provided (or streaming of the data object can be initiated) in a response to the request. As noted, data stored in the object-level data storage service 214 may be organized into data objects. The data objects may have arbitrary sizes except, perhaps, for certain constraints on size. Thus, the object-level data storage service 214 may store numerous data objects of varying sizes. As described herein, the object-level data storage service 214 may store any type of document, such as a document source file, a common representation underlay, a preview, a thumbnail or extracted document text, among others.

The virtual computing service 216 may be a collection of computing resources configured to instantiate virtual machine instances on behalf of an entity of the computing resource service provider 210 (such as the document management and collaboration system 206) or on behalf of a customer. A party may interact with the virtual computing service 216 (via appropriately configured and authenticated API calls) to provision and operate virtual computer systems that are instantiated on physical computing devices hosted and operated by the virtual computing service 216. The virtual computer systems may be used for various purposes, such as to operate as servers supporting a website, to operate business applications or, generally, to serve as computing power. Further, the virtual computer systems may be used to support database applications, electronic commerce applications, business applications and/or other applications. Although the virtual computing service 216 is shown in FIG. 2, any other computer system or computer system service may be utilized, such as a computer system or computer system service that does not employ virtualization or instantiation and instead provisions computing resources on dedicated or shared computers/servers and/or other physical devices.

The task management and workflow service 218 may be a collection of computing devices and other resources collectively configured to perform task coordination and management services that enable executing computing tasks across a plurality of computing environments and platforms. The task management and workflow service 218 tracks the progress of workflow execution and performs the dispatching and holding of tasks. Further, the task management and workflow service 218 may control the assignment of hosts or physical or virtual computing machines used for executing the tasks. A user may define a workflow for execution, whereby the workflow may include one or more tasks. The workflow may be defined using an application programming interface (API) configured function call to the task management and workflow service 218. Further, the user may specify task order for the workflow, conditional flows and timeout periods for restarting or terminating the execution of the workflow. In addition, execution loops for the workflow may be defined. As described herein, workflow execution may by asynchronous and may be preceded by synchronous execution of database writes.

The managed directory service 222 may be a collection of computing devices and other resources collectively configured to serve as a directory that enables users to log on to computing resources of the computing resource service provider 210 using one set of credentials and to enable administrators to uniformly apply security policies to the computing resource service provider 210. The managed directory service 222 may enable a web-based console for user and group management and may be used as an authentication system for user credentials.

The custom search service 224 may be a collection of computing devices and other resources collectively configured to permit customized searches of data sets and enable establishing security or authentication requirements on a party performing a search. Further, the custom search service 224 allows for data set replication to enable consistent performance in the case of outages. As described herein, the customer search service 224 may be utilized for maintaining a search index of customer documents and their associated metadata. Further, to ensure consistent performance the searchable metadata or customer documents may be replicated to ensure consistent performance and guard against outages.

The scalable database service 226 may be a collection of computing devices and other resources collectively configured to provide a structured storage system that facilitates the storage and retrieval of documents or data. The scalable database service 226 may be non-relational and may be based on a key-value model. Examples of the scalable database service 226 include a NoSQL database (for example, to be distinguished from a relational structured query language (SQL) database). The scalable database service 226 may be used to store metadata associated with documents, users and organizations. In addition, scalable database service 226 may store access privileges for users of an organization.

In the environment illustrated in FIG. 2, a notification service 228 is included. The notification service 228 may comprise a collection of computing resources collectively configured to provide a web service or other interface and browser-based management console. The management console can be used to configure topics for which customers seek to notify applications (or people), subscribe clients to the topics, publish messages, or configure delivery of the messages over clients' protocol of choice (i.e., hypertext transfer protocol (HTTP), e-mail and short message service (SMS), among others). The notification service 228 may provide notifications to clients using a "push" mechanism without the need to periodically check or "poll" for new information and updates.

Figure 3:
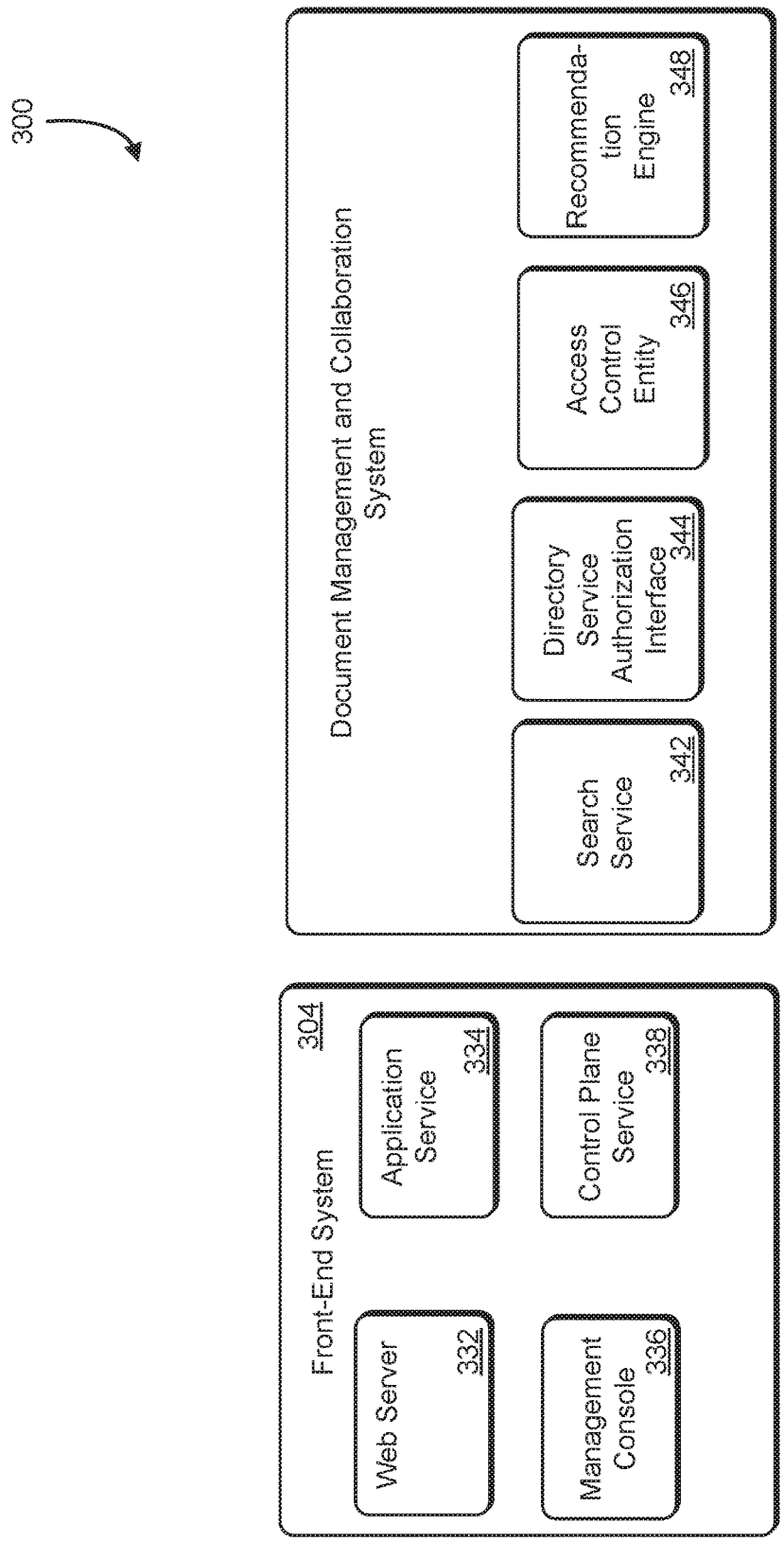
FIG. 3 shows the functional entities of the front-end system and the document management and collaboration system in accordance with at least one embodiment.

FIG. 3 shows the functional entities of the front-end system and the document management and collaboration system in accordance with at least one embodiment. The front-end system 304 includes a web server 332, an application service 334, a management console 336 and a control plane service 338. The web server 332 may enable the execution of a web site, a single-page web application or a single-page interface that permits a user to transmit or upload documents to the document management and collaboration system 306 and manage the documents. The web server may further enable the user to view and edit documents, and provide commentary or feedback on the documents. The web server 332 may also enable an administrator or a user to set permissions or share modes that specify the privileges given to a user in accessing documents, for example, using an access control policy. In addition, the web server may enable users or devices to submit authentication credentials. The content distribution edge network, described with reference to numeral 212 in FIG. 2, may be used to distribute content of the web server 332. The actions performed by the user may be done via a website, an application or a management console and the web server 332 may enable executing the website, application or management console. Although one web server 332 is described with reference to FIG. 3, it may be contemplated that multiple web servers of any type may be used, whereby a portion of the web servers may be redundant.

The application service 334 may be a collection of computing devices and other resources collectively configured to serve as a user-exposed service that receives requests from the user and services the requests. A user request may be made using a website or a management console accessible to the user or a client that is executed on a user's device may make service requests on behalf of the user. The request may be an API function call and the application service 334 may process the request and manage its execution. The application service 334 may also be responsible for receiving user credentials and request authentication of the user from an authentication service. To cause the performance of operations requested by the user, the application service 334 may make one or more function calls to services or entities of the computing resource service provider 210. For example, the application service 334 may request user or access token validation from the managed directory service 222 or may cause search indices maintained by the customer search service 224 to be updated.

The management console 336 may be a collection of computing devices and other resources collectively configured to permit organizations, administrators and users to register for utilizing document management and collaboration services. The management console 336 may be used in addition or as an alternative to a website or an application running on a user device and may permit users and administrators to make service requests using appropriately configured API function calls. For example, the management console 336 may be used for inviting a user to join a document collaboration system and view and collaborate on documents. Further, the management console 336 may be used for allowing dashboard access, audit log access, permission setting (for example, for administrators and user), storage limit setting (for example, for organizations and users) and security setting (for example, password and encryption).

The control plane service 338 of the front-end system 304 may be a collection of computing devices and other resources collectively configured to serve as an interface that enables creating new computing instances for document collaboration and management. Instances may be created by transparently creating a directory in the managed directory service 222 or associating an existing directory (for example, maintained by the managed directory service 222 or by a user or administrators) for document management and collaboration. The control plane service 338 may be utilized to create a document directory and the document directory may be executed and served by the managed directory service 222. The document directory may be associated with an organization having an administrator that is capable of providing permissions and privileges to users. Following the creation of the directory, the application service 334 may be used to enable functions affecting folders or documents of the directory.

The document management and collaboration system 306 includes a search service 342, a directory service authorization interface 344, an access control entity 356 and a recommendation engine 358. The search service 342 may be a collection of computing devices and other resources collectively configured to cause an uploaded document to become searchable. For example, the search service 342 may facilitate text extraction for a document, whereby the extracted text may be used to construct a character map for the document as described herein. The directory service authorization interface 344 enables the document management and collaboration system 306 to delegate user authentication to another entity such the managed directory service described with reference to numeral 222 in FIG. 2. The document management and collaboration system 306 may submit user access tokens to the authenticating party via the directory service authorization interface 344 and may receive a response indicating whether a user may be authenticated. As described herein, the access control entity 346 may be a collection of computing devices and other resources collectively configured to control user access to one or more documents retained by the document management and collaboration system 306. The access control entity 346 may evaluate an enforced access control policy and determine whether one or more requested actions may be authorized. Further, the access control entity 346 may receive one or more recommendations regarding access granted to one or more users and may determine whether the recommendations may be enforced based at least in part on a received access control policy.

Figure 4:
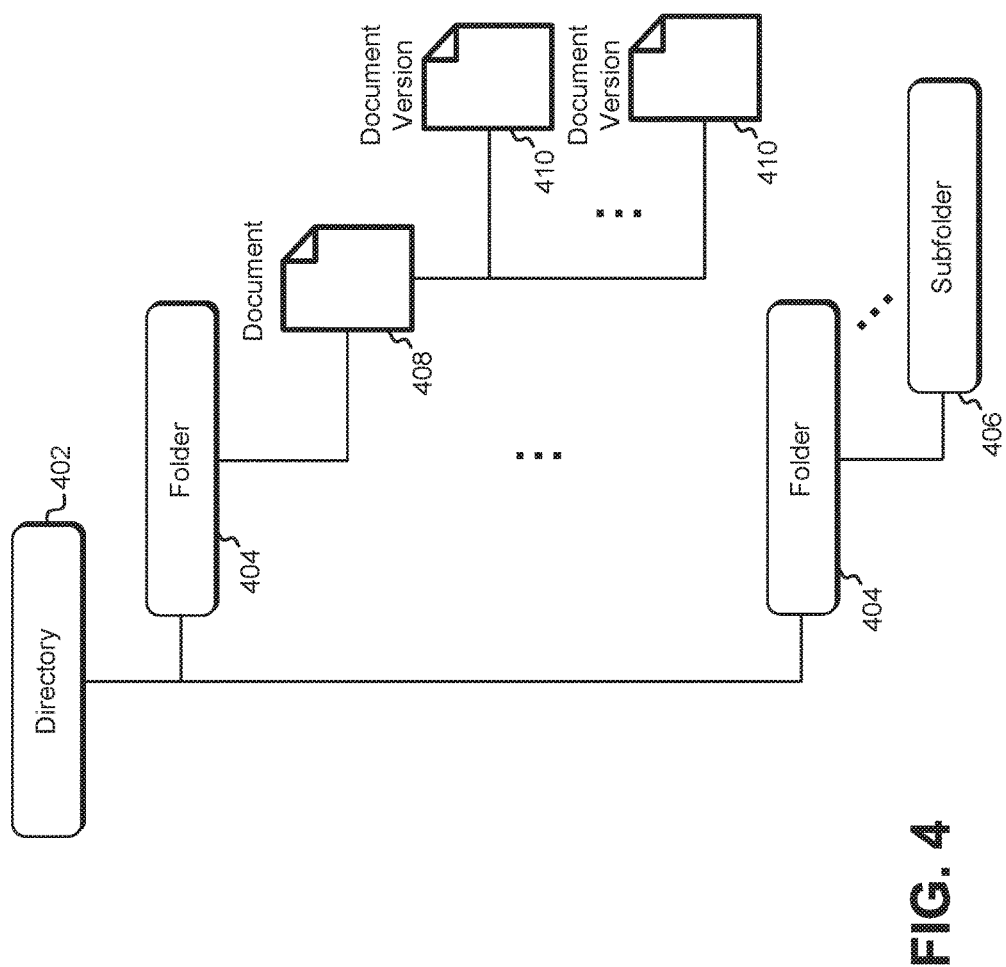
FIG. 4 shows an example of directory structure in accordance with at least one embodiment.

FIG. 4 shows an example of directory structure in accordance with at least one embodiment. A directory 402 may be maintained by a managed directory service and may be associated with an organization, which may, in turn, have one or more directories 402. The directory 402 includes one or more folders 404 (singularly referred to herein as folder 402). Further, a folder 404 may include one or more subfolders 406 that are nested within the folder 404. As may be recognized, a subfolder 406 may further include one or more nested subfolders. A folder 404 may be a file structure within the directory 402 and, in some embodiments, the security or permission privileges associated with the folder 404 may apply to documents 408 within the folder 408 or subfolders 406 that are nested within the folder 404.

A folder 404 may retain one or more documents 408 (singularly referred to herein as document 408). As described with reference to FIG. 4, a document may include a plurality of document versions 410. A document version 410 may be one revision of a document 408 or a subsequent version or revision of an existing document including, for example, user modifications and changes. Further, the permission or security privileges provided with respect to a document may apply to the plurality of document versions 410 associated with the document 408. Each document version 410 may have a plurality of representations including a native document, an underlay and an overlay. The native document may be an originally uploaded document (for example, in a file format compatible with a productivity suite). An underlay may be a portable representation of the native document that may be rendered on a user device utilizing a web application or a document management and collaboration application. In addition, an overlay may be a representation of annotations made by users and collaborators. For example, an overlay may include a representation of highlights or text commentary.

It is noted that more than one document versions 410 may include the originally uploaded document as the native document. Although as described with reference to FIG. 4, a document 408 includes a plurality of versions 410, whereby each version 410 may include a plurality of representations, as used in various contexts herein, a document may be any one of the versions or any one of the representations. For example, as used herein a user uploaded document may be the native document and an annotation document may be the overlay. The organization structure shown in FIG. 4 may be rendered in various styles or formats on a user device utilizing a web application or a document management and collaboration application.

Figure 5:
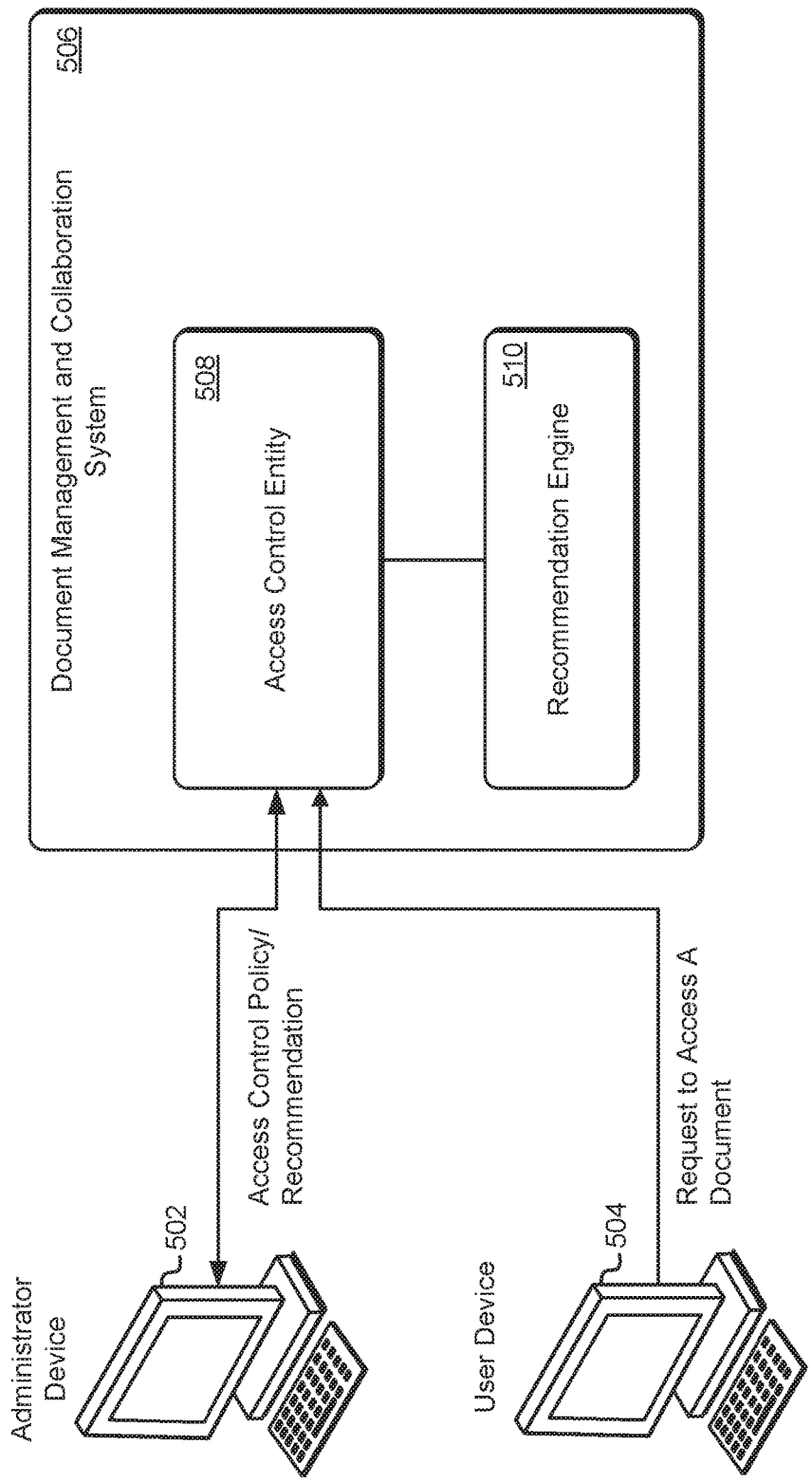
FIG. 5 shows an example of a document management and collaboration system in accordance with at least one embodiment.

FIG. 5 shows an example of a document management and collaboration system in accordance with at least one embodiment. The document management and collaboration system 506 includes an access control entity 508 and a recommendation engine 510. The access control entity 508 manages access to one or more documents, folders or directories retained by the document management and collaboration system 506. The access control entity 508 also enforces access control policies that are established by administrators or users of the document management and collaboration system 506. The access control entity 508 may receive an access control policy from an administrator operating an administrator device 502 and may utilize the policy to control user access to documents, folders or directories maintained by the document management and collaboration system 506. As described herein, an administrator of an organization may have an authority to specify privileges for access to an organization directory, folders or subfolders within the directory or documents within a folder, subfolder or directory. It is noted that the administrator may manage more than directory of the document management and collaboration system 506. For example, the administrator may specify the users that may have access to a directory or its contents and the privileges of the users to share the directory or its contents with other users.

An access control policy may specify whether the user is permitted to share a document with one or more users that are registered as being part of the organization or one or more users that belong to a domain name (for example, based at least in part on the user's email address). Further, the access control policy may specify that a user is permitted to share a document with any user, such as a user that is not registered with the document management and collaboration system 506. As described herein, sharing a document may include sharing a folder or a subfolder of documents or sharing any group of documents. Further, if the document sharing is permitted by the policy, a user may be able to view the document and collaborate on the document by providing comments and feedback, among others.

The recommendation engine 510 may be used to provide recommendations regarding access privileges afforded to users. The access privileges may have varying level and may include a permission to view, modify or annotate a document, among others. A recommended access privilege may be required to confirmed or accepted by an organization administrator before being enforceable. In addition, an access control policy of an administrator may specify that recommended access privileges may be enforced without prior acknowledgement from an organization administrator.

A user may seek to permit one or more other users access to one or more documents maintained by the document management and collaboration system 506. The access may entail that the one or more other users view the one or more documents and be able to comment on the one or more documents or modify the one or more documents. In some embodiments, the one or more users for which access is sought may be anonymous users, whereby the access control entity 508 may not retain information associated with the one or more users. For example, if the users are anonymous, the users may not have an account with the document management and collaboration system 506, and, accordingly, the access control entity 508 may not be able to identify the users as being members of an organization or a group.

A user may share a document with an anonymous user by, for example, causing a uniform resource locator (URL) associated with the document to be provided to the anonymous user. The anonymous user may, in turn, use the URL to access the document. As described herein, an access control policy may specify whether a user or a group of users is permitted to share a document or a group of documents with an anonymous user. If permitted, the anonymous user may be able to view and comment on the document but, for example, may not be able to upload documents to the document management and collaboration system 506 due to the fact that the anonymous user is not registered as a user of the document management and collaboration system. Upon receiving a request for access by the user, the document management and collaboration system 506 may enable the user to register with the document management and collaboration system 506. If anonymous sharing is not permitted by the access control policy, an anonymous user may not be able to access a shared document. Further, the document management and collaboration system 506 may not be used for sending an identifier of the document to the anonymous user, such as a URL link to the document. As described herein, sharing documents with anonymous users may facilitate viral sharing, whereby a member of an organization may share a document with one or more parties that are not registered users of the document management and collaboration system 506.

One or more users of the document management and collaboration system 506 may have a federated identity that may be used to collectively enforce an access control policy. The federated identity may be based at least in part on a domain name of an identity of the one or more users. For instance, users that are part of a domain name, such as example.com, may be part of a federated identity based at least in part on an email address of the users, such as user1@example.com and user2@example.com. An administrator may specify collective policies for users having a federated identity. As described here, the policies may specify privileges given to members of a federated identity when an organization member shares one or more documents with the members of the federated identity. For example, the policy may specify that documents may be shared with members of a specified federated identity but may not be shared with anonymous users that are not members of a federated identity.

Figure 6:
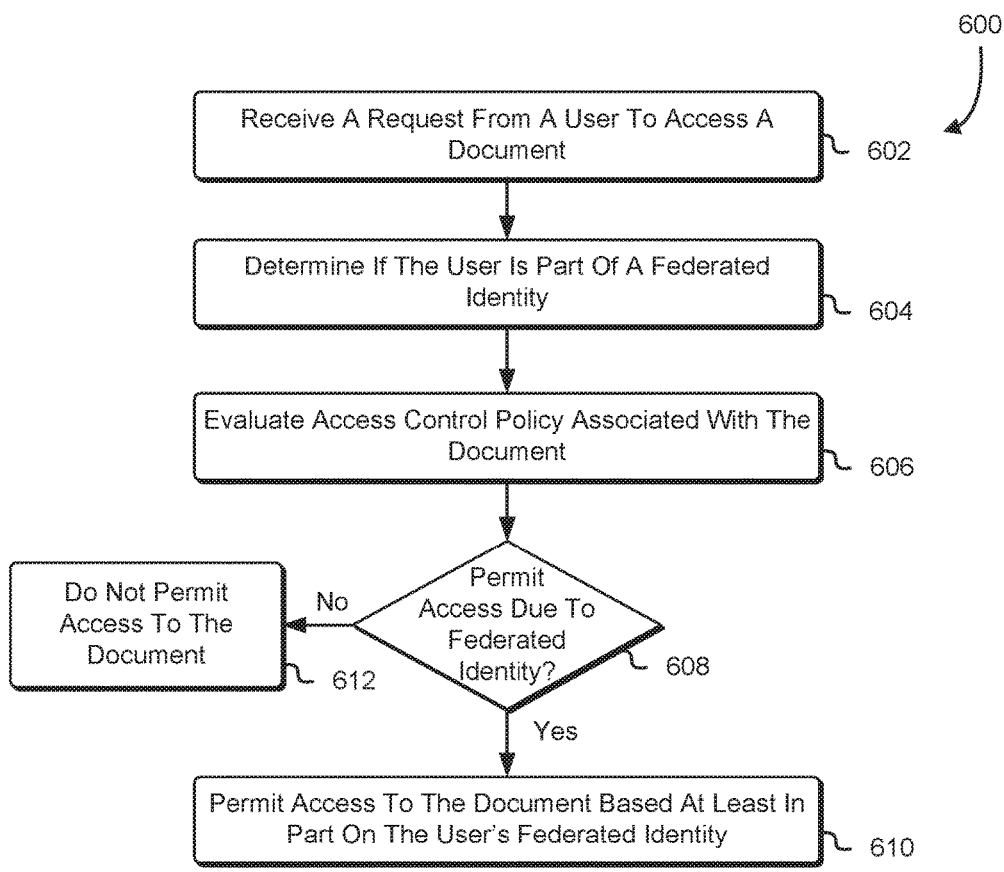
FIG. 6 shows an example of a method for evaluating an access request based at least in part on a requester's identity in accordance with at least one embodiment.

FIG. 6 shows an example of a method for evaluating an access request based at least in part on a requester's identity in accordance with at least one embodiment. In the process 600, an access control entity, such as access control entity 508 described with reference to FIG. 3, receives 602 a request from a user to access a document. As described herein, the request may enable the user to view the document or comment on the document, among others. Further, in alternative embodiments, the request may enable user access to a group of documents. The user may not be registered with a document management and collaboration system or may not be a member of an organization that utilizes the resources provided by the document management and collaboration system. Accordingly, the document management and collaboration system may not retain information indicating whether the particular user has access privileges.

The access control entity determines 604 if the user is part of a federated identity. For example, the access control entity may evaluate the request to obtain an identity associated with the user, such as an email address, and may determine whether the user's identity is part of a federated identity for a group of users or potential users that may request access to one or more documents. The access control entity evaluates 606 an access control policy associated with the document. The access control policy may specify restrictions that are to be enforced for controlling access to the document. The access control policy may specify, among others, one or more federated identities for groups of users that may be permitted or denied access to the document.

The access control entity determines 608 whether to permit the user access to the document based at least in part on the federated identity of the user. As described herein, the user may belong to a domain name that is granted access to the document by the access control policy. If the access control entity determines that the user it to be permitted access based at least in part on the user's federated identity, the access control entity permits 610 access to the document based at least in part on the user's federated identity. After access is permitted, the user may, for example, annotate or provide feedback on the document. If a negative determination is made, the access control entity does not 612 permit access to the document.

Determining whether a user is associated with a federated identity may include authenticating a user's credentials to verify that the user is associated with the federated identity. When the federated identity is a domain name, the user may be required to log in to the document management and collaboration system using an email address that is part of the domain name. Further, the user may be authenticated by sending a link to the email address and requiring the user to follow the link in order to complete the authentication process.

The access control policy may further specify whether access to a document may be granted based at least in part on system-generated suggestions or recommendations. As described herein, the document management and collaboration system may generate one or more suggestions regarding access granted to users. The suggestions may be counter or in conflict with elements of the existing policy, whereby, for example, a suggestion may call for permitting user access to a document that is not specified in the policy. Accordingly, the policy may specify whether a suggestion that is counter to an existing policy may be enforceable. As described herein, the system-generated suggestions or recommendations access grants may be based at least in part on one or more patterns associated with users or document or one or more attributes associated with users or documents.

Figure 7:
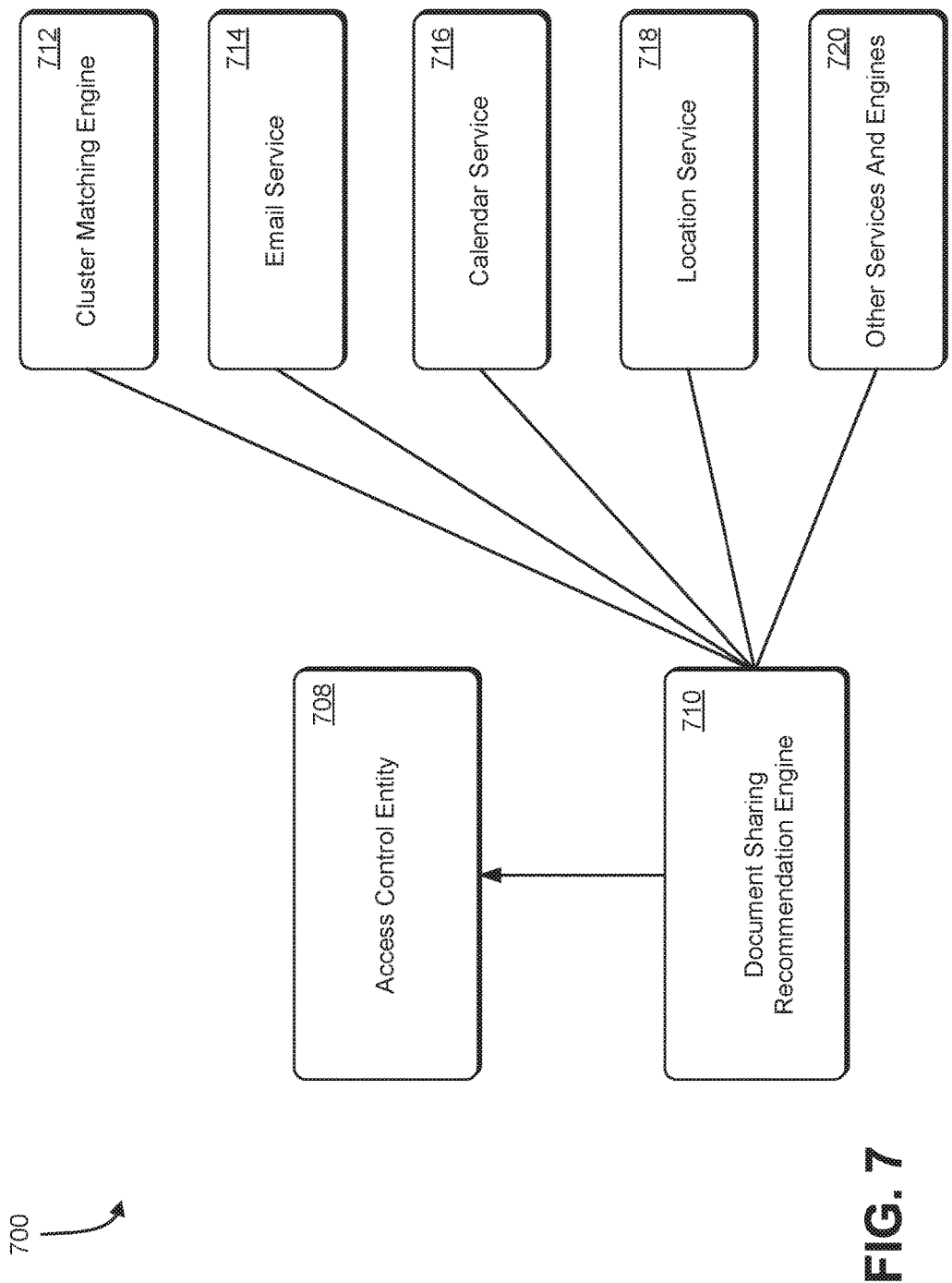
FIG. 7 shows an environment for providing document sharing suggestions in accordance with at least one embodiment.

FIG. 7 shows an environment for providing document sharing suggestions in accordance with at least one embodiment. In the environment 700, a document sharing recommendation engine 710 may generate one or more suggestions for user sharing privileges and provide the one or more suggestions to an access control entity 708. The access control entity 708 may retain an access control policy, for example, that is specified by an administrator, and may determine based at least in part on the access control policy whether a suggestion provided by document sharing recommendation engine 710 may affect access to one or more documents by users.

The document sharing recommendation engine 710 may be in communication with a variety of services and engines and may use information provided by one or more services or engines to generate suggestions regarding document sharing. As shown in FIG. 7, the document sharing recommendation engine 710 may communicate with a cluster matching engine 712, an email service 714, a calendar service 716, a location service 718 and one or more other services and engines 720. The cluster matching engine 712 may be a collection of computing devices and other resources collectively configured to construct a weighted cluster of keywords, phrases, strings or any type of characters utilized by a user. The cluster may be constructed based at least in part on one or more documents that the user accessed (for example, by viewing, annotating or uploading, among others). As described herein, text or characters of documents may be stored in an object-level data storage service, such the object-level data storage service described with reference to numeral 226 in FIG. 2. The cluster matching engine 712 may access the object-level data storage service to obtain the text of documents associated with a user. The cluster matching engine 712 may then construct a weighted cluster for the user that associates one or more characters with a weight, whereby the weight may be a function of the frequency of occurrence of the string of characters in documents related to the user. For example, the weight may be proportional (for example, linearly or non-linearly) to the frequency of occurrence of the strings of characters in documents related to the user.

When a document is received by the document management and collaboration system, the cluster matching engine 712 may construct a cluster (also known as a word cloud) for the document. The cluster matching engine 712 may then identify one or more users whose access behavior correlates with the received document. For example, the one or more users may access or upload similar documents. To identify the one or more users, the cluster matching engine 712 may correlate the cluster of the received document with clusters of one or more users and provide the results (such as a similarity measure) to the document sharing recommendation engine 710 for use in making access recommendations. When constructing a cluster or when correlating two or more clusters, common words or phrases, such as, "and", "the" or "network", may be assigned lesser weight than less common phrases, such as "cluster matching" or "access control policy". Accordingly, the similarity measure between a document and a user may be more heavily weighted by an overlap in less common phrases than more common phrases.

In addition to receiving one or more similarity measures from the cluster matching engine 712, the document sharing recommendation engine 710 receives information related to a link or a relationship between two or more users or between a user and a document from an email service 714. For example, the document sharing recommendation engine 710 may receive information indicating a document uploaded by a user was referenced in an email to another user. Accordingly, the indication may suggest that it may be advantageous for the document to be shared with the other user.

In addition, the document sharing recommendation engine 710 may receive indications of a link between users or users and documents from a calendar service 716 or a location service 718. For example, the calendar service 716 may notify the document sharing recommendation engine 710 if a user that submitted a document to the document management and collaboration system is scheduled for a meeting with one or more other users. The document sharing recommendation engine 710 may utilize the notification to indicate to the access control entity 708 that the document may be shared with the one or more other users for the duration of the meeting. In addition, information received from the location service 718 may be used to alter the suggestion. For example, if the document sharing recommendation engine 710 receives an indication from the location service 718 that a party to the meeting is not in attendance based at least in part on the party's location, the document sharing recommendation engine 710 may alter the suggestion based at least in part on the received indication. For example, the document sharing recommendation engine 710 may not recommend that the document be shared with the party.

In addition, the document sharing recommendation engine 710 may receive attributes associated with one or more users. The attributes may, for example, specify whether the user is a subject matter expert in a certain area. The user may be tagged as a subject matter expert by an administrator or other users (for example, using peer recommendation). Further, the user may be self-designated as a subject matter expert. A user that is a subject matter expert may be provided with access privileges to access or review documents. The expertise of the user may be evaluated in conjunction with a character cluster for a document to determine whether the subject matter expertise of the user qualifies the user as a reviewer of the document. Further, a user may request to be given access privileges for a document in order to access the document for review.

The document sharing recommendation engine 710 may utilize one or more indications received from the engines and service 712-720 to provide document sharing suggestions to the access control entity 708. The one or more indications may factor in varying level to a generated suggestion. For example, the document sharing recommendation engine 710 may weight a similarity measure received from the cluster matching engine 712 more heavily in generating a sharing recommendation than an indication of a link received from the calendar service 716.

As described herein, document sharing suggestions may be incorporated into an access policy of an organization and enforced for providing access to users. In alternative embodiments, the suggestion may only be provided to an administrator of an organization and the administrator or the organization may determine whether to incorporate the suggestions in their policy. For example, in some embodiments, it may be not desirable for an adaptive mechanism for providing access to be used as the basis for providing access to documents. In the cases where sensitive documents (for example, private documents) are shared, the suggestions may be desired be sought to be confirmed by an administrator prior to being enforced as part of an access control policy.

Document sharing suggestions may also be based at least in part on user behavior or user interaction with the document management and collaboration system. For example, the document management and collaboration system may receive a document from a user, whereby the document may be shared with a set of users. If, within a specified period of time, the user sends a second document to the document management and collaboration system, it may be suggested that the second document be shared with the same set of users. The recommendation may be reinforced if the two documents have similar content as determined by, for example, a similarity measure.

Figure 8:
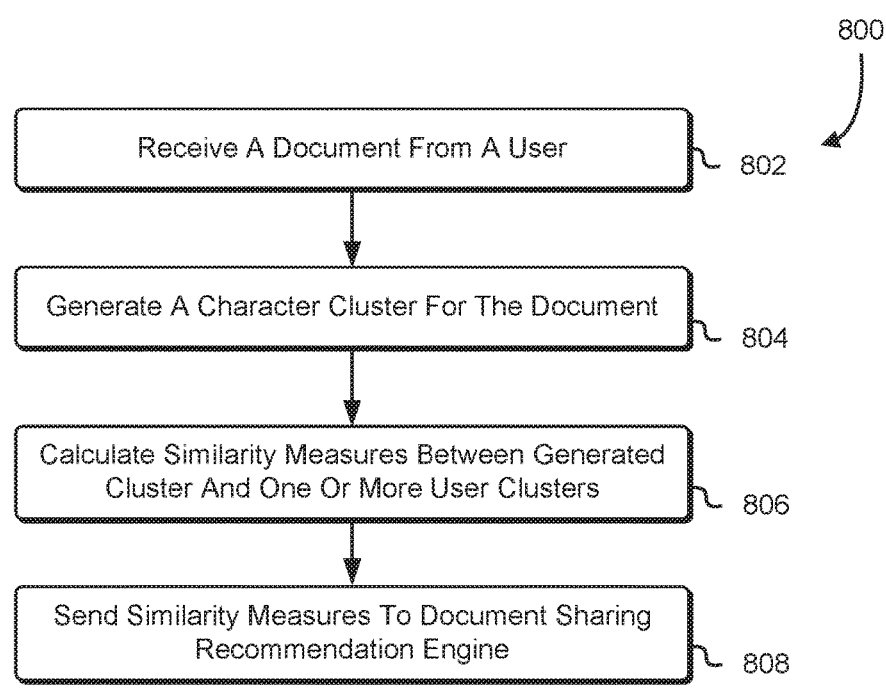
FIG. 8 shows an example of a method for generating a similarity measure for a document in accordance with at least one embodiment.

FIG. 8 shows an example of a method for generating a similarity measure for a document in accordance with at least one embodiment. In the process 800, a document management and collaboration system receives 802 a document from a user. The document may be uploaded by a user that is a member of an organization and, upon being uploaded, may become part of a group of documents for the organization. The document management and collaboration system or an entity thereof, such as a cluster matching engine, generates 804 a character cluster for the document. To generate the character cluster, the cluster matching engine may analyze the text of the document to determine one or more characters, such as words or phrases, that are part of the document and associate each character of the one or more characters associated with a weight. The weight may be based at least in part on the frequency with which the character occurs in the document. Further, the weight may be based at least in part on historical data maintained by the document management and collaboration system. The historical data may specify the frequency with which a certain character has been observed to occur in documents, whereby if the character is observed more frequently in the received document than specified by the historical data, the weight associated with the character in the cluster may be increased and vice-versa.

The cluster matching engine then calculates 806 a similarity measure between the generated cluster and one or more clusters that are associated with one or more users. As described herein, a similarity measure may be a measure of significance or a measure of user affinity for a document. For example, the similarity measure may be a distance, such as the Euclidean distance, in n-dimensional space between the generated cluster for the document and a generated cluster for a user. Further, the similarity measure may be a result of applying a correlation function to one or more weights of the characters of the document and one or more weights of the characters of the user. When a correlation function is used, the higher the correlation, the greater the similarity. The one or more users may not presently have access to the document, and the similarity measure may be calculated in order to determine whether the one or more users should be provided access to the document based at least in part on their interest in the content of the document. The similarity measure may be calculated by comparing the generated cluster of the document with character clusters of one or more users. For each user, the similarity measure may indicate user interest in the content of the document. After calculating the similarity measures, the cluster matching engine sends 808 the similarity measures to a document sharing recommendation engine to be used for suggesting modifications to an existing access control policy.

Figure 9:
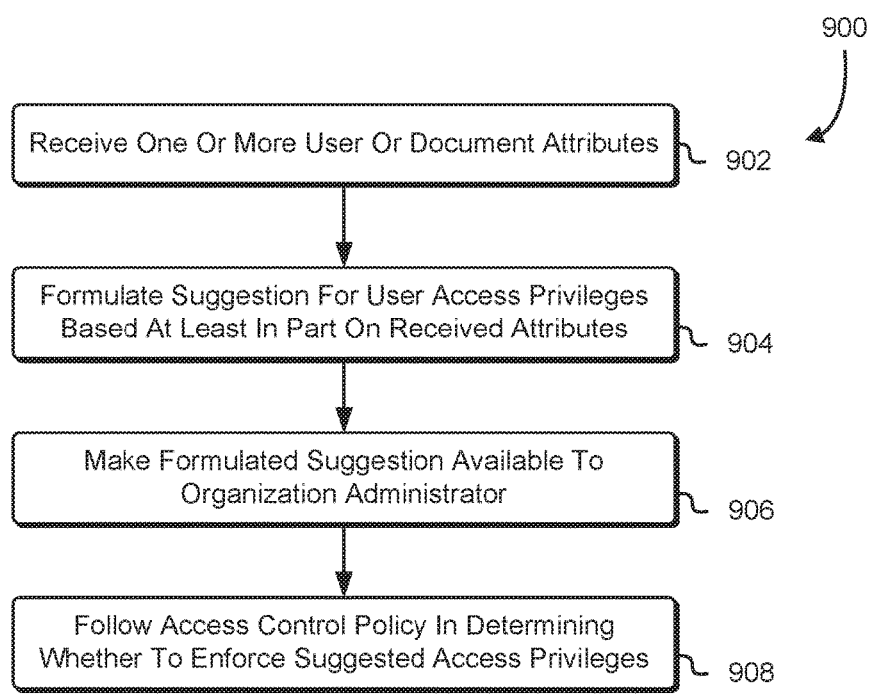
FIG. 9 shows an example of a method for recommending a change to access privileges in accordance with at least one embodiment.

FIG. 9 shows an example of a method for recommending a change to access privileges in accordance with at least one embodiment. In the process 900, a document sharing recommendation engine receives 902 one or more user or document attributes. The attributes may be received in order to provide a recommend change to access privileges of a user. As described herein, the attributes may be received from a cluster matching engine, an email service, a location service or a calendar service, among others. Further, the attributes may be used to calculate user affinity for a document or a measure of significance of a document to a user, whereby the calculated affinity or measure may increase or decrease based at least in part on the received attributes. The document sharing recommendation engine then formulates 904 a suggestion for user access privileges based at least in part on the received attributes (or the calculated affinity or measure). For example, the received attributes may be used to suggest whether a user should be permitted access to a document. Further, if the user is permitted access, a duration for access may be recommended, among others.

The document sharing recommendation engine then makes 906 the suggested access privileges available to an organization administrator or a user and follows 908 an access control policy in determining whether to enforce the suggested access privileges. The administrator or the user may be responsible for the document or for controlling access to the document. For example, the access control policy may specify that the suggested access privileges are required to be accepted by the administrator prior to be being enforced. Further, the access control policy may specify that the suggested access privileges may be enforced with acceptance. Accordingly, the access privileges for a user may be set based at least in part on user activity in accessing the document management and collaboration system or services utilized by the user.

In some embodiments, the suggested access privileges may be made available to an administrator or a user by including the suggested access privileges in an email to the administrator or the user or by causing a notification to appear in an application utilized by the administrator or the user, whereby the application may be a browser-based application or an independent application executed for accessing or managing documents retained by the document management and collaboration system. For example, the notification may be a popup that appears in a side panel of the application. Further, the suggested access privileges for user access to the document management and collaboration system may be based at least in part on access privileges that are given to the user for accessing other services. For example, a user's privilege level for accessing the document management and collaboration system may correspond to the user's privilege level for accessing the email service or calendar service. A user that is already granted a set of privileges for accessing services, such as the email service or calendar service, may be granted a minimum set of privileges for access documents retained by the document management and collaboration system.

In some embodiments, the document sharing recommendation engine may compare the suggested access privileges to access privileges specified in an existing policy (for example, a policy presenting enforced). The comparison may be performed in order to determine one or more changes that may be made to the existing policy. The document sharing recommendation engine may then provide the recommended change for the access privileges to an administrator. The administrator may specify whether the policy should be modified in accordance with the recommended change. For example, the administrator may choose whether one or more recommendation to be incorporated in the access control policy. In some embodiments, the administrator may specify (for example, using the access control policy) that all recommended changes are to be incorporated in the policy. In other embodiment, the access control policy may specify that a recommended change is to be confirmed by the administrator before it is enforced.

The access control entity of the document management and collaboration system may enable baselining of user access permissions. Baselining may be performed to improve overall security of a document management system. In one embodiment, a user that shared a document with another user or expanded a permission associated with a document may be required to take action in order for the permissions to be kept in place. Baselining access permissions may also be performed for more than one document, such as groups, folders or collections of documents. If user does not take the proactive action, the permission may be reduced to a specified level (for example, as specified in an access control policy. For example, the user may be requested to verify that the one or more users whose permission was expanded may continue to retain their privileges. An access control policy may specify when the baselining of user access permissions may be performed. For example, the access control policy may specify that a user be requested to confirm access privileges periodically or according to a time schedule. Further, the baselining of user access permissions may be performed based at least in part on user activity, among other factors. An administrator or an access policy may specify the trigger for performing baselining or set the time schedule or period of time for performing baselining. For example, if a set time limit expires before a user accesses one or more document, the user's privilege for accessing the document may be reduced to specified level. An access control policy may specify whether a user's permission may be baselined automatically or whether an administrator confirmation is required before the user's permission may be reduced.

Figure 10:
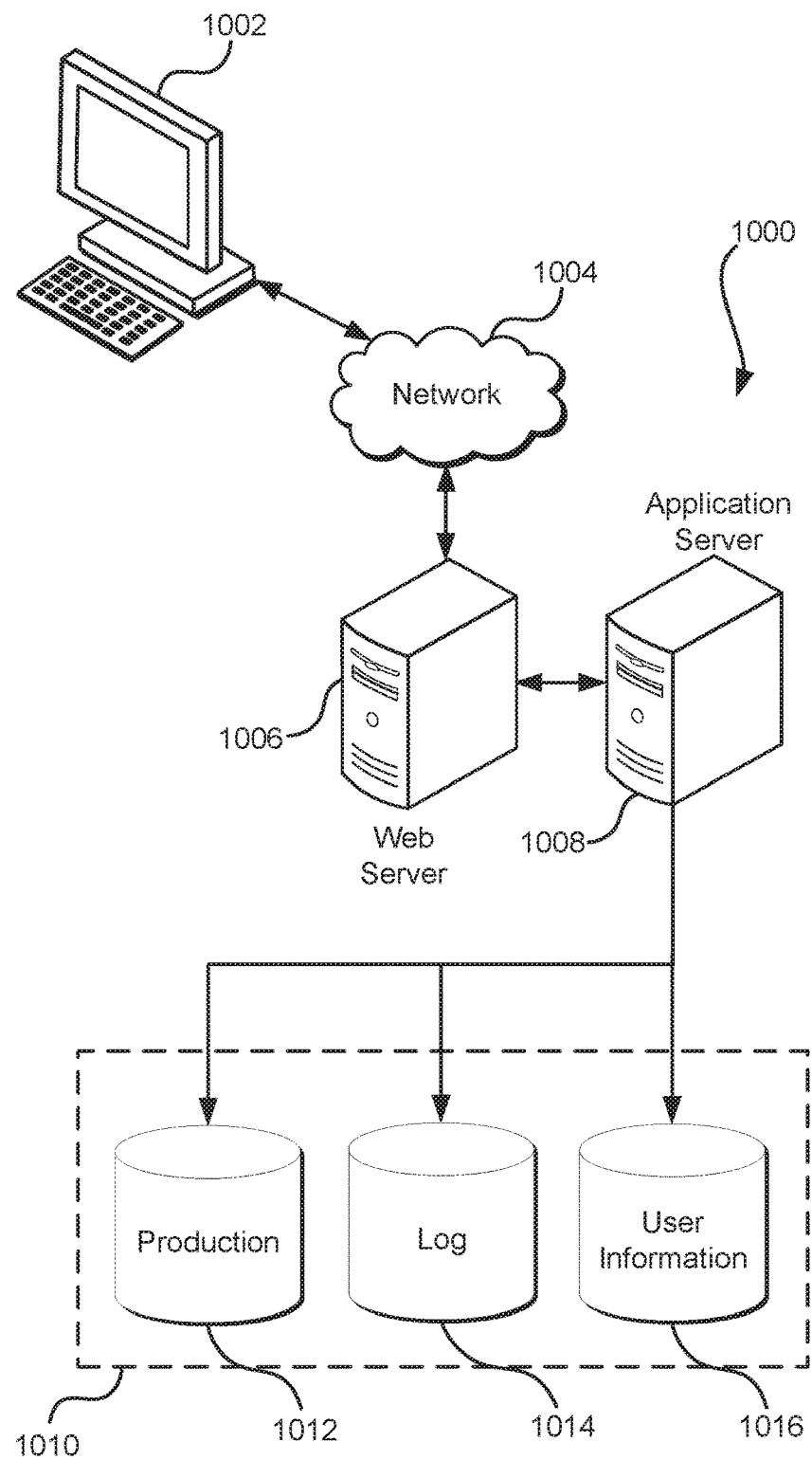
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
obtaining a set of attributes associated with a set of users of a document management and collaboration system, the document management and collaboration system maintaining a set of documents and the set of attributes including information indicating interactions by the set of users with one or more services;
determining, at the document management and collaboration system, a set of access privileges for at least one document of the set of documents maintained by the document management and collaboration system by at least obtaining the set of attributes, wherein at least one attribute of the set of attributes indicates a measure between a first character map associated with the at least one document and a second character map associated with a first user of the set of users;
providing a notification indicating the set of access privileges available to a second user of the set of users, the second user being responsible for the at least one document;
obtaining, from the second user, an indication to enforce the set of access privileges; and
enabling the set of users to access to the at least one document in accordance with the set of access privileges.

2. The computer-implemented method of claim 1, wherein the set of attributes further comprises information of extracted content indicating suggestions to allow additional users to access the at least one document based at least in part on interactions of the first user of the set of users with the one or more services in connection with the at least one document.

3. The computer-implemented method of claim 1, wherein the second character map is based at least in part on content of one or more documents obtained by the second user.

4. The computer-implemented method of claim 1, wherein the one or more services comprises at least one of: an email service, a calendar service, a directory service, or a location service.

5. A system, comprising:
one or more processors; and
memory that includes instructions that, as a result of execution by the one or more processors, cause the system to:
generate, at a document management and collaboration system, a recommended access privilege for one or more users based at least in part on one or more attributes associated with a user, wherein at least one of the one or more attributes is obtained from a cluster matching engine that indicates a significance measure between a weighted cluster of characters utilized by the user and a second weighted cluster of characters determined based at least in part on at least one document maintained by the document management and collaboration system;
determine to modify an access policy associated with the at least one document maintained by the document management and collaboration system based at least in part on the recommended access privilege, the recommended access privilege indicating one or more changes to the access policy to enable the one or more users to access the at least one document based at least in part on the user's access to the at least one document maintained by the document management and collaboration system; and
cause the recommended access privilege for the one or more users to be enforced.

6. The system of claim 5, wherein the at least one attribute of the one or more attributes is obtained from a cluster matching engine in connection with the document management and collaboration system.

7. The system of claim 6, wherein the at least one attribute obtained from the cluster matching engine indicates a weighted cluster of characters obtained from a data storage service with documents utilized by the user.

8. The system of claim 5, wherein at least one other attribute of the one or more attributes further includes information based on determining content from the user's interactions with one or more services.

9. The system of claim 5, wherein the memory further includes instructions that, as a result of being executed by the one or more processors, cause the system to:
obtain, from the user, a request to access the at least one document; and
provide the user with access to the at least on document in response to the request based at least in part on an evaluation of the recommended access privilege indicating to grant the user access to the at least one document.

10. The system of claim 9, wherein:
the evaluation of the recommended access privilege indicates that the user is to be permitted to perform at least one operation of: view the document, annotate the document, modify the document, and provide feedback on the document; and
wherein providing the user access to the document further comprises enabling the user to perform the at least one operation.

11. The system of claim 5, wherein the memory further includes instructions that, as a result of being executed by the one or more processors, cause the system to:
obtain, from an administrator associated with the at least one document, an indication that the recommended access privilege in not to be enforced; and
provide access to the at least one document based at least in part on the access policy.

12. The system of claim 8, wherein the one or more services comprises at least one of:
a notification service,
a messaging service,
a virtual computing service, or
an on-demand storage service.

13. A non-transitory computer-readable storage medium having stored thereon executable instructions that, as a result of being executed by one or more processors of a computer system, cause the computer system to at least:
obtain an access control policy specifying privileges of a set of users for accessing a document maintained by a document management and collaboration system;
formulate, at the document management and collaboration system, a set of recommended access privileges for the set of users based at least in part on one or more attributes associated with the set of users, at least one attribute of the one or more attributes is a measure between a first character cluster and a second character cluster, wherein the first character cluster is based at least in part on characters included in the document and the second character cluster is obtained based at least on one or more attributes associated with a first user of the set of users;

provide the set of recommended access privileges to a second user of the set of users to accept the set of recommended access privileges; and modify the access control policy based at least in part on the set of recommended access privileges based at least in part on an indication to enforce the set of recommended access privileges obtained from the second user.

14. The non-transitory computer-readable storage medium of claim 13, wherein the access control policy specifies that formulating additional sets of recommended access privileges of the set of users is to be performed due to an occurrence of a trigger.

15. The non-transitory computer-readable storage medium of claim 13, wherein the instructions further comprise instructions that, as a result of being executed by the one or more processors, cause the computer system to, on a condition that the second user does not provide the indication to enforce the set of recommended access privileges, set the access control policy of the set of users to a second privilege level specified by an administrator.

16. The non-transitory computer-readable storage medium of claim 13, wherein the one or more attributes associated with the set of users further comprises at least one attribute indicating a second user's interaction with an e-mail service of one or more services.

17. The non-transitory computer-readable storage medium of claim 16, wherein the least one attribute indicating a second user's interaction with an e-mail service of one or more services further comprises a cluster map generated based at least in part on e-mail messages obtained by the second user or e-mail messages generated by the second user.

18. The non-transitory computer-readable storage medium of claim 13, wherein the one or more attributes associated with the set of users further comprises at least one attribute indicating a second user's interaction with a computing resource service provider.

19. The non-transitory computer-readable storage medium of claim 13, wherein the instructions that cause the computer system to formulate the set of recommended access privileges further comprise instructions that, as a result of being executed by the one or more processors, cause the computer system to formulate the set of recommended access privileges based at least in part on one or more attributes associated with the set of users, at least one attribute of the one or more attributes obtained based at least in part on content indicating suggestions to provide additional users access the document based at least in part on user interactions with one or more services associated with the document.

20. The non-transitory computer-readable storage medium of claim 13, wherein the instructions further comprise instructions that, as a result of being executed by the one or more processors, cause the computer system to tag the document based at least in part on a subset of users of the set of users provided access to the document based at least in part on the set of recommended access privileges.

* * * * *